(12) United States Patent
Struthers et al.

(10) Patent No.: US 8,061,094 B2
(45) Date of Patent: **\*Nov. 22, 2011**

(54) SANDING SHIELD FOR IN-WALL COMPONENTS

(75) Inventors: Scott Struthers, San Clemente, CA (US); Ray Call, Mission Viejo, CA (US); Nick Snyder, Irvine, CA (US); Greg Fetter, Capistrano Beach, CA (US)

(73) Assignee: Dana Innovations, San Clemente, CA (US)

( \* ) Notice: Subject to any disclaimer, the term of this patent is extended or adjusted under 35 U.S.C. 154(b) by 5 days.

This patent is subject to a terminal disclaimer.

(21) Appl. No.: 12/889,341

(22) Filed: Sep. 23, 2010

(65) Prior Publication Data

US 2011/0000144 A1   Jan. 6, 2011

Related U.S. Application Data

(63) Continuation-in-part of application No. 12/555,534, filed on Sep. 8, 2009, which is a continuation-in-part of application No. 12/427,591, filed on Apr. 21, 2009, which is a continuation-in-part of application No. 12/202,870, filed on Sep. 2, 2008, which is a continuation-in-part of application No. 11/954,667, filed on Dec. 12, 2007, now Pat. No. 7,461,483, which is a continuation-in-part of application No. 11/566,365, filed on Dec. 4, 2006, now Pat. No. 7,699,138, which is a continuation of application No. 11/548,381, filed on Oct. 11, 2006, now Pat. No. 7,963,076, said application No. 11/954,667 is a continuation-in-part of application No. PCT/US2007/016404, filed on Jul. 19, 2007.

(60) Provisional application No. 60/825,162, filed on Sep. 11, 2006, provisional application No. 60/950,237, filed on Jul. 17, 2007, provisional application No. 61/325,112, filed on Apr. 16, 2010.

(51) Int. Cl.
*E04C 2/52* (2006.01)
(52) U.S. Cl. ............................. 52/220.1; 52/509; 52/478
(58) Field of Classification Search ................. 52/220.1, 52/514, 509, 478; 49/463
See application file for complete search history.

(56) References Cited

U.S. PATENT DOCUMENTS 1,795,062 A \* 3/1931 Warner ........................ 52/220.1
2,666,546 A \* 1/1954 Reilly ............................ 220/3.4
(Continued)

FOREIGN PATENT DOCUMENTS
WO   2008/119180   10/2008

*Primary Examiner* — Basil Katcheves
(74) *Attorney, Agent, or Firm* — Fish & Associates, PC

(57) ABSTRACT

An installation mount for an in-wall component has a sloped spackle rim around a recessed opening. The recessed opening is shaped to accept either a sanding shield or a component cover. While the sanding shield is in the recessed opening, an installer could spackle the front surface of the installation mount and can then sand the spackle away until the sanding shield is exposed, creating a surface that is flush with the rest of the wall. The sanding shield could then be so that the sanding shield could be used to protect the interior of the installation mount during sanding, while the component cover could be used while the component cover is in use to protect the component and provide a flush-mount look and feel.

11 Claims, 7 Drawing Sheets

U.S. PATENT DOCUMENTS

| | | | |
|---|---|---|---|
| 2,770,759 A * | 11/1956 | Ahlgren | 335/285 |
| 4,890,418 A * | 1/1990 | Sachs | 49/463 |
| 5,375,723 A * | 12/1994 | Kelley | 211/1.3 |
| 5,653,061 A * | 8/1997 | Hiner | 49/463 |
| 5,793,522 A * | 8/1998 | Brun | 359/350 |
| 6,037,106 A | 3/2000 | Komatsu | |
| 7,622,675 B2 * | 11/2009 | Sutter | 174/66 |
| 2008/0194187 A1 | 8/2008 | Bennett | |

* cited by examiner

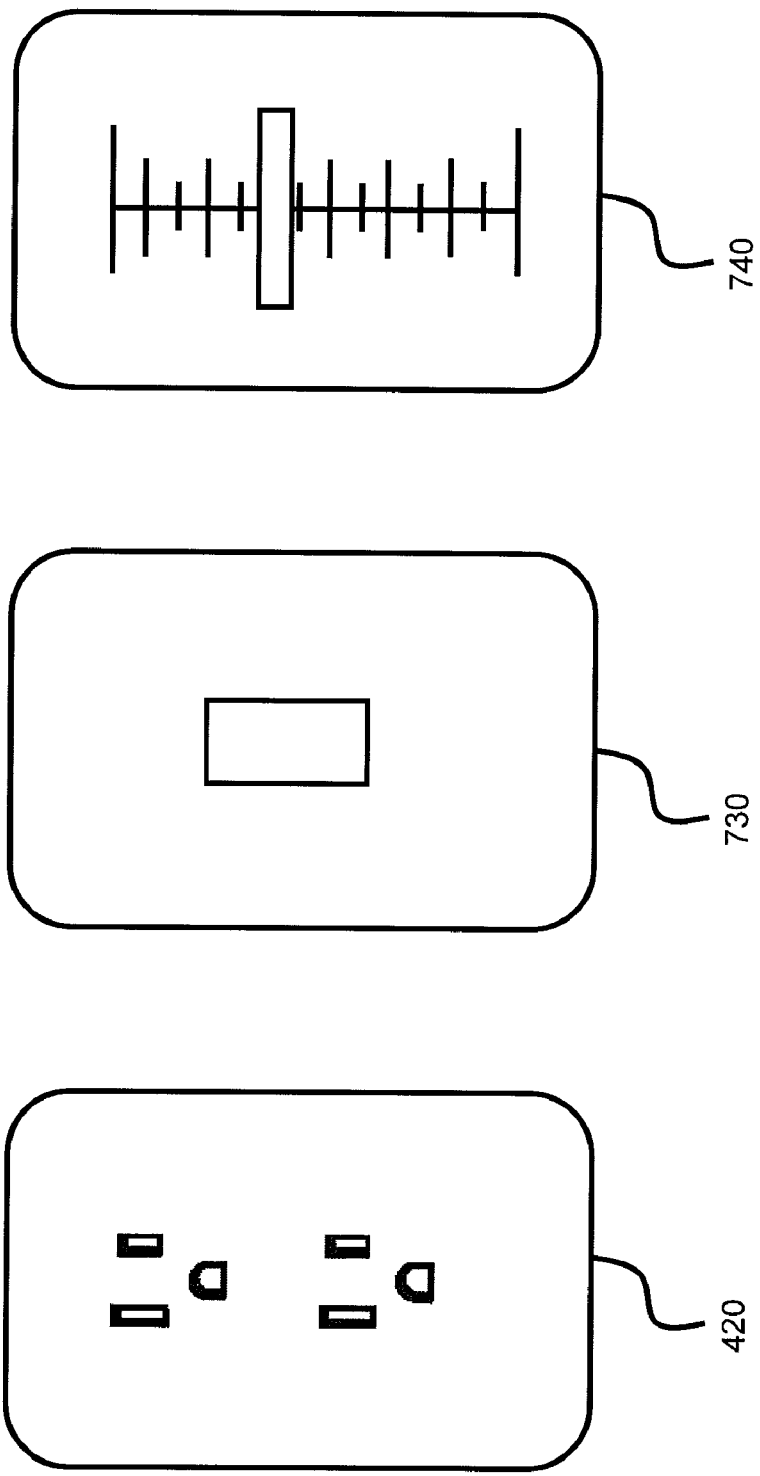

SANDING SHIELD FOR IN-WALL COMPONENTS

This application claims the benefit of priority to U.S. Provisional Application 61/325,112, filed on Apr. 16, 2010. This application is also a continuation-in-part of co-pending U.S. application Ser. No. 12/555,534 filed Sep. 8, 2009. U.S. application Ser. No. 12/555,534 is a continuation-in-part of U.S. application Ser. No. 12/427,591 filed Apr. 21, 2009 which is a continuation-in-part of U.S. application Ser. No. 12/202,870 filed Sep. 2, 2008 which is a continuation-in-part of U.S. application Ser. No. 11/954,667 filed Dec. 12, 2007, now Issued U.S. Pat. No. 7,461,483 which is a continuation-in-part of U.S. application Ser. No. 11/566,365 filed Dec. 4, 2006, now Issued U.S. Pat. No. 7,699,138 which is a continuation of U.S. application Ser. No. 11/548,381 filed Oct. 11, 2006 which claims priority to U.S. Provisional Application 60/825,162 filed Sep. 11, 2006 and claims priority to U.S. Provisional Application 60/950,237 filed Jul. 17, 2007. U.S. application Ser. No. 11/566,365 is also a continuation-in-part of International Application PCT/US07/16404 filed Jul. 19, 2007 which claims priority to U.S. application Ser. No. 11/548,381 filed Oct. 11, 2006, U.S. Provisional Application 60/825,162 filed Sep. 11, 2006 and U.S. Provisional Application 60/950,237 filed Jul. 17, 2007. All prior applications are incorporated by reference in their entirety.

FIELD OF THE INVENTION

The field of the invention is sanding protection devices.

BACKGROUND

When finishing wood or other abrasive surfaces, installation engineers frequently need to sand or plane the surface smooth. During such an installation, surfaces near to the unfinished surface need to be protected during the sanding process. US20080194187 to Bennett teaches a sanding device that uses bumpers to prevent a sanding belt from accidentally sanding a nearby surface. Bennett and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein or in extrinsic materials should be interpreted as being inclusive of their endpoints, and open-ended ranges should be interpreted to include only commercially practical values. Similarly, all lists of values should be considered as inclusive of intermediate values unless the context indicates the contrary.

Bennett, however, only prevents sanding belts from touching surfaces that are a few centimeters away or more from the unfinished surface. A bumper does not have the accuracy to prevent a sanding belt from sanding a surface directly adjacent an unfinished surface. U.S. Pat. No. 6,037,106 to Komatsu solves this problem by teaching a sanding mask that fits over a surface adjacent an unfinished surface. A sandblaster could then safely blast both the unfinished surface and the mask, leaving the surface under the mask untouched. Komatsu, however, fails to prevent a sandblaster from wearing away too much material from the unfinished surface. WO2008119180 to Arbel prevents a sandblaster from wearing away too much material from the unfinished surface by teaching a cover piece that is installed over the operative surface of a wall outlet. After fill material is spackled over the cover piece and the rest of the wall outlet, the fill material is sanded until the cover piece is exposed enough to be removed. Since the fill material only protrudes slightly from the front of the wall outlet, Arbel's outlet has an illusion of a flush-mount appearance. Arbel's cover piece, however, creates an unsightly recess in front of the operative surface of the wall outlet after the cover piece is removed.

Thus, there is still a need for systems and methods of protecting a surface directly adjacent to an unfinished surface during sanding which allows for a better flush-mount look and feel.

SUMMARY OF THE INVENTION

The inventive subject matter provides apparatus, systems and methods in which a sanding shield limits the sandable area about an in-wall component. As used herein, a "sandable area" about an in-wall component is an area that could be sanded by a sanding surface, for example sandpaper or a sandblaster. Typically, the sanding shield limits the sandable area about an in-wall component by covering the in-wall component in some way, thereby preventing the sanding surface from coming in direct contact with a surface of the component by getting in between the sanding surface and the in-wall component. As used herein, a "component" should be interpreted as generically representing all practical wall mounted components, including for example, electrical outlets, data connectors, controllers, light and other switches, lighting, HVAC vents, sprinkler systems, smoke detectors, speakers, touch screens, and so forth. Various electrical and data wires and other cables are not shown in all of the figures, but should be assumed, and could be those conventionally contemplated in the art.

Preferred sanding shield systems include a spackle rim with a recessed opening that provides access to a component that is mounted to a bracket behind the spackle rim. As used herein, a "recessed opening" is a hole that is skirted (i.e. at least partially surrounded) by a recess. Such recesses could be advantageously configured such a sanding shield placed within the recessed opening sits on top of the skirted recess, preventing the sanding shield from falling into the hole. While the sanding shield could be shaped to only cover a part of the hole, the sanding shield is preferably sized and dimensioned to cover the entire hole to prevent particulate matter from entering the hole and is more preferably sized and dimensioned to cover the entire recess as well as the hole. Since at least a portion of the component is generally accessible via the hole in the recessed opening, the sanding shield thereby protects that portion component from being sanded when mounted within the recessed opening. As used herein, a sanding shield that is "mounted" within a recessed opening is coupled to the recessed opening in such a way that the sanding shield does not fall out of the recessed opening when force is removed, for example by using a latch or a magnetic attachment. Preferably, the sanding shield is sized and disposed to fit so snugly in the recess that friction forces prevent the sanding shield from falling out of the recessed opening.

Typically, the bracket has a front surface with the recessed opening and a mount that holds the component, which may all be molded from a single piece or may be constructed from separate pieces. For example, if the wall component is a heavy speaker embedded in drywall, the mount could be made of a sturdy metal frame to hold the heavy component while the front surface could be made from a less durable thermoplastic.

The bracket is typically attached to a partition before attaching the component to the bracket. Exemplary brackets are taught in co-pending application Ser. No. 12/555,534 and its related parent applications, which are incorporated herein by reference. As used herein, the term "partition" should be construed broadly to mean any sort of mechanical barrier used as a ceiling, wall, door, or floor. Partitions can be made of any suitable material, including for example, plywood, plaster, wood, wood pulp, gypsum, stone, concrete, brick, and so forth. One preferred material is Aquatough™, due to its strength and water-resistance. The partitions can be supporting or non-supporting, so that even acoustic tiles used in a ceiling would be considered partition as the term is used herein. Similarly, wooden logs that form a wall in a log house would also be considered a partition as the term is used herein. Subsets of partitions include ceiling/wall partitions (i.e., barriers used as ceilings and/or floors), and wall partitions (i.e., barriers used as walls).

Where the wall component is to be installed into a wall comprising drywall, the partition is preferably a panel such as those taught in application Ser. No. 12/555,534, incorporated herein by reference. It is contemplated that the panel could be prefabricated with a hole sized and dimensioned to receive the mounting bracket to reduce the time and cost of installation. Such holes could be fabricated such that the components and covers are flush mounted with the finished wall, ceiling, floor or other surface. The hole in the panel preferably has a skirted recess to receive the mounting bracket similar to the skirted recess of the recessed opening. Preferably a front surface of the recessed opening is slightly recessed from the front surface of the partition to allow for spackle component to fill in the surrounding area and form a substantially flush surface after installation.

Flush mounting is generally achieved by installing the mounting bracket and recessed opening into the partition such that the front-most portion of the recessed opening is substantially flush with the front of the partition. Preferably, at least a portion of the perimeter of the recessed opening has a sloped spackle rim that is capable of being sanded down by more than a millimeter by applying at least 10 pounds per square inch across the surface for 100 cycles. An installer could then spread spackle component across a surface of the partition up to the spackle rim of the mounting bracket and then could sand excess spackle component from the front of the mounting bracket after the spackle component dries. The front surface of the bracket between the outer perimeters and the spackle rim are preferably non-planar to increase the surface area that receives the spackle component and "grip" the spackle component better. In an exemplary embodiment, the gripping surface is scored in multiple directions, for example a horizontal and a vertical direction, to prevent the mounting bracket from sliding in any direction after the spackle component has been applied.

As used herein, surfaces that are "substantially flush" to one another means surfaces that diverge from one another by at most 0.05 in. (1.27 mm). Preferably, substantially flush surfaces diverge from one another by at most 0.02 in. (0.0508 mm) or by at most 0.01 in. (0.254 mm). Preferably, the front-most portion of the spackle rim projects at least 0.01 in (0.0254 mm) from the front-most portion of the panel so as to provide some tactile and/or visual feedback when the installer sands away a portion of the spackle rim around the sanding shield. In other embodiments, the front-most portion of the spackle rim projects at least 0.03 in. (0.762 mm) or at least 0.05 in. (1.27 mm) from the front of the panel.

The sanding shield is preferably made from a visually or tactilely distinct material from standard spackle components so that an installer who sands the spackle component will know when to stop sanding. For example, the sanding shield could be made of a transparent or black material, so that an installer could sand the spackle component until the sanding shield is clearly visible through the dried spackle component. Preferably, the sanding shield is made from a colored (non-white) material, since most spackle components are white when they dry. In another embodiment, the sanding shield could comprise a rough material, so that the installer could sand the spackle component until the installer feels or hears the sound of a different material being sanded. Since the front-most portion of the spackle rim slightly projects from the front of the panel, any damage to the spackle rim by over-sanding would be negligible.

In an alternative embodiment, the tip of the spackle rim that projects past the front surface of the panel comprises a visually or tactilely distinct material from the rest of the spackle rim that not only sends a signal to the installer when the tip of the spackle rim is being sanded away, but also sends a signal to the installer when the installer has sanded the spackle rim to be level with the front of the panel. For example, the tip of the spackle rim could comprise a granular material that easily wears away and sends a tactile signal up the arm of an installer that he should stop sanding, while the rest of the spackle rim is comprised of a tougher thermoplastic; or the tip of the spackle rim could comprise a first color, while the rest of the spackle rim comprises a second color visually distinct from the first color. Preferably, the tip of the spackle rim comprises a material with less mohs of hardness than the rest of the spackle rim, causing the tip to be easier to sand away. Preferably, the spackle rim protrudes from the front of the sanding shield by at least 0.005 in (0.0127 mm) or 0.01 in (0.0254 mm) and at most only 0.2 in (0.508 mm) or 0.1 in. (0.254 mm) of the tip is worn away while sanding.

Once the spackle component has been applied and sanded away, the front of the sanding shield should appear to be contiguous and flush with the panel. The installer could then remove the sanding shield and dispose a fascia plate in the recessed opening. The sanding shield could be removed by reaching behind the shield and popping it out of the recessed opening, or by pulling on a handle coupled to the sanding shield itself. In an exemplary embodiment, the handle comprises a hole with a width greater than 0.5 in (1.27 cm) or 0.75 in (1.905 cm) to allow an installer's finger to pull the spackle shield out. In another embodiment, the sanding shield has a recess that receives a handle that could be used to remove the sanding shield from the mount.

Preferably, the fascia plate and the sanding shield are interchangeably mountable within the recessed opening, such that a front surface of the fascia plate is at the same depth when mounted in the recessed opening as a front surface of the sanding shield when mounted in the recessed opening. In one embodiment, the fascia plate has substantially the same thickness as the sanding shield so that the front of the fascia plate is also substantially flush with the front of the panel. As used herein, thicknesses that are "substantially the same" as one another are within 0.01 in. (0.254 mm) from one another, and are preferably within 0.005 in. (0.127 mm) from one another. A plurality of different fascia plates could be provided that provide distinct looks from one another to the front of the wall component, and some fascia plates could reveal different portions of the wall component depending on design. For example, a fascia plate for a wall outlet could reveal the electrical connections for the plug while covering all other parts of the wall outlet and a fascia plate for a monitor could reveal the screen while covering everything else.

Exemplary fascia plates hide the attachment means between the fascia plate and the component cover, such as those disclosed in application Ser. No. 12/251,951, incorporated herein by reference. In a preferred embodiment, the fascia plate comprises magnets that couple to magnetically attractive portions of the component cover.

The inventive subject matter also provides apparatus, systems, and methods in which a wall component is installed into a partition, where the front surface of the wall component could be adjusted angularly with respect to the front surface of the partition. The component is generally installed into the partition by coupling a bracket to an opening in the partition, and then by coupling the component to the bracket. The partition opening could be cut on or off site to accommodate the bracket, or the partition could be molded to have a hole sized and dimensioned to receive a component bracket. The bracket could be coupled to the partition in any suitable manner, for example by using a chemical adhesive, screws, or by clamping the bracket to both front and rear sides of the partition opening. Preferably, the bracket is coupled to only the rear side of the partition so that no part of either the component or the bracket substantially protrudes from the front surface of the partition. As used herein, a surface that "substantially protrudes" from a surface extends less than 1 mm past the surface plane.

In an exemplary embodiment, the bracket comprises at least two sections, a front bracket and a rear bracket where the front bracket is coupled to the partition and the rear bracket is coupled to wall infrastructure systems, such as electrical wires or liquid/air conduits. This way, the front bracket could be provided to an installer who specializes in installing brackets to wall partitions while the rear bracket could be provided to an installer who specializes in installing wall infrastructure systems for wall components, and the two brackets could be coupled at a later time. Preferably, the wall infrastructure is installed to the rear bracket before the partition is installed over the rear bracket. In an exemplary embodiment, the rear bracket is configured to attach to the front bracket at a variety of depths, allowing for a variety of depths to hold the wall component.

Once the bracket is sufficiently coupled to the partition, the component could be coupled to the bracket, and is preferably slightly recessed from the front of the recess such that a component cover could fit within the recess and optionally a fascia plates. The fascia plate and the component cover are sized and dimensioned such that the front surface of the fascia plate or the component cover is substantially flush with the front surface of the partition. The component cover has at least one depth adjustment mechanism that allows an installer to adjust the depth of a part of the component cover with respect to the front surface of the partition.

Preferably, the component cover has two, three, four, or more depth adjustment mechanisms close to the edges of the component cover to allow an installer to adjust the depth of the component cover angularly with respect to the front surface of the partition. This is especially useful for partitions with irregular surfaces, such as stone partitions, where one edge of the partition hole could protrude further than another edge of the partition hole. The depth adjustment mechanisms are preferably located within 0.5 in, 0.25 in., or even ⅛ in. from an edge or a corner of the component cover. Providing multiple depth adjustment mechanisms also increases tension on the depth adjustment mechanisms, preventing the mechanism from sliding out of place post-installation. In an exemplary embodiment, the depth adjustment mechanisms are threaded adjustment screws that comprise affixed washers. Preferably, each depth adjustment mechanism is lockable at a certain depth to prevent the component cover from easily shifting between depths when subjected to a sharp impact or vibration.

In exemplary embodiments, a fascia plate is provided that fits over the component cover to hide the adjustment mechanisms from view. In such an embodiment, the component cover is preferably slightly recessed from the front surface of the partition such that when the fascia plate is placed within the recess, the front of the fascia plate is substantially flush with the front of the partition. Since the fascia plate generally covers the depth adjustment mechanisms, a separate leveling plate is preferably utilized by an installer during installation to help adjust the various depths of the depth adjustment mechanisms. A leveling plate generally has the same size and dimensions as the fascia plate, but allows an installer to access the depth adjustment mechanisms, usually by providing holes in front of the depth adjustment mechanism. An installer using a leveling plate would generally match the edges of the leveling plate with the edges of the partition hole during installation to achieve a substantially flush look and feel. After the component cover has been adjusted appropriately, the installer could then remove the leveling plate and then attach the fascia plate to the front of the component cover. Of course, where a component cover is not used, the installer would simply match the edges of the component cover with the edges of the partition hole during installation.

Where the wall component is to be installed into a wall comprising drywall, the partition is preferably a panel. It is contemplated that the panel could be prefabricated with a hole sized and dimensioned to receive the mounting bracket to reduce the time and cost of installation. Such holes could be fabricated such that the components and covers are flush mounted with the finished wall, ceiling, floor or other surface. The hole in the panel preferably has a skirted recess to receive the mounting bracket, such that the gripping surface of the bracket is slightly recessed from the front of the panel and the surrounding wallboard while the front-most portion of the spackle rim projects at least 0.01 in (0.254 mm) from the front of the panel. In other embodiments, the front-most portion of the spackle rim projects at least 0.03 in. (0.762 mm) or at least 0.05 in. (1.27 mm) from the front of the panel.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 7 shows alternative fascia plates in accordance with the subject matter of the invention.

DETAILED DESCRIPTION

Figure 1:
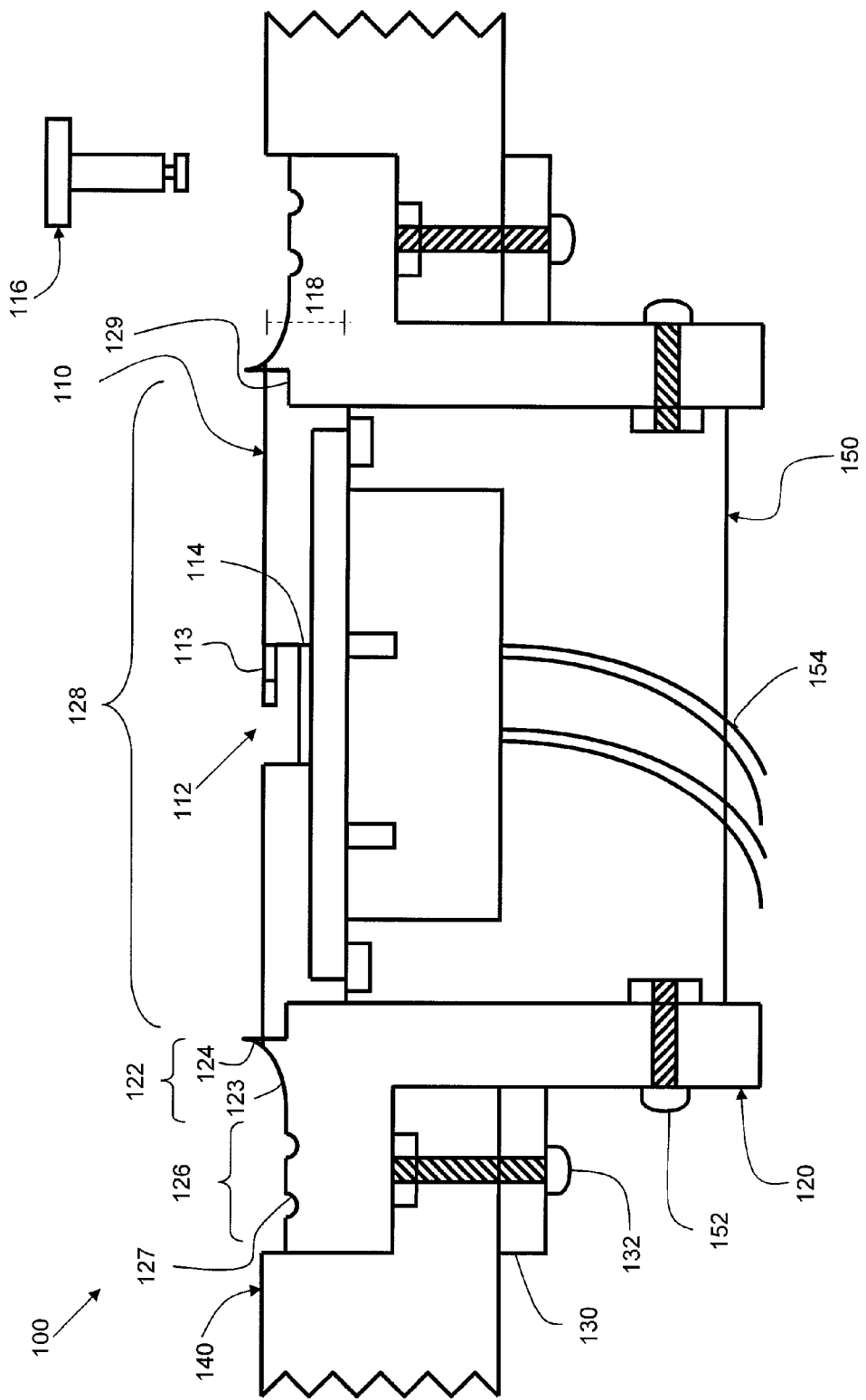
FIG. 1 is a side cross-sectional view of an exemplary mounting bracket and sanding shield
Figure 2:
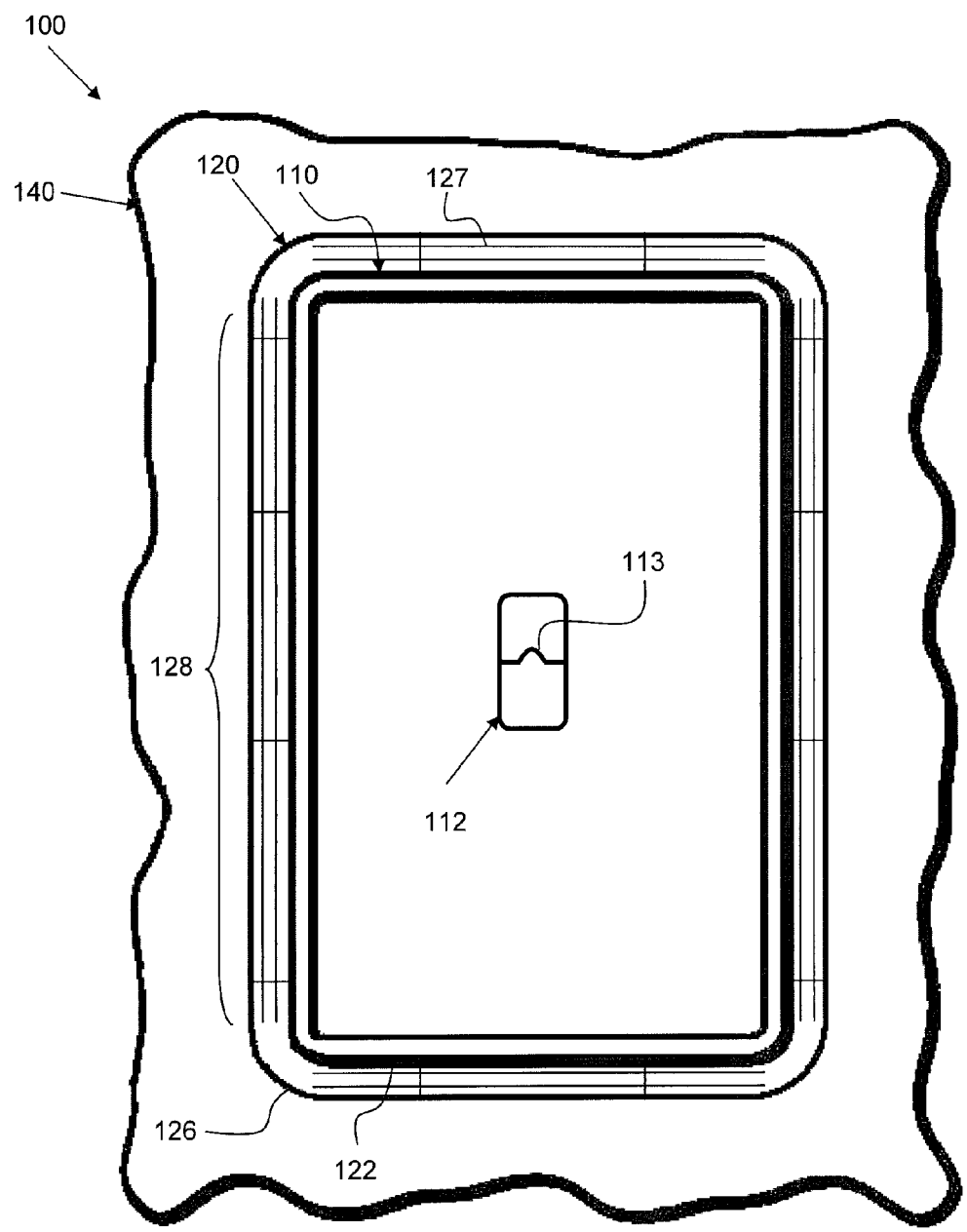
FIG. 2 is a front perspective view of the mounting bracket and sanding shield of FIG. 1.

In FIG. 1, the flush mounting apparatus 100 generally has a wall component 150 that is attached to mounting bracket 120 with threaded screws 152, which in turn is attached to partition 140 using rear bracket 130 and threaded screw 132. While screws are used as an attachment means, other attachment means are contemplated, for example clips, nails, and magnets. Using screws to attach the components is by no means meant to limit the scope of the claims. While wall component 150 is shown here as a wall outlet with electrical wires 154, wall component 150 can be used euphemistically herein to represent any component that may be installed in a wall, whether electrical or non electrical.

Mounting bracket 120 generally comprises a spackle rim 122, a gripping surface 126, and a recessed opening 128. Recessed opening 128 allows access to the front of component 150, and recessed opening 128 is skirted with a projection 129 that serves as a "shelf" for sanding shield 110 to rest upon. While projection 129 is a single projection that extends along the entire perimeter of recessed opening 128, projection 129 could instead comprise a plurality of projections that hug a perimeter of the recessed opening without departing from the scope of the invention. Gripping surface 126 is scored along lines 127 to increase the surface area of gripping surface 126 when a spackle component is spread along its surface.

Sanding shield 110 with thickness 118 comprises a transparent thermoplastic, but may be made of any suitable color of any sanding-resistant material without departing from the scope of the invention. Sanding shield 110 has a recess 112 with an upper cover 113 sized and dimensioned to mate with a handle 116 and a lower cover 114 that prevents much of the sanded spackle from falling into the mounting bracket and possibly contaminating wall component 150. Sanding shield 110 is sized and dimensioned to cover all of entire recessed opening 128 including projection 129. Preferably the fit between sanding shield 110 and recessed opening 128 produces enough friction forces to hold sanding shield 110 within recessed opening 128 when mounting bracket 120 or partition 140 is tilted in any direction, however other attachment mechanisms could be used to hold sanding shield 110 in place, for example suction cups or tabs.

Spackle rim 122 is sized and dimensioned such that the upper-most tip 124 of spackle rim 122 extends approximately 0.01 in. (0.254 mm) from the front of sanding shield 110 and from partition 140. The upper-most tip 124 of spackle rim 122 is made of a granular material that is sanded away easier than the lower section 123 of spackle rim 122, allowing for a tactile difference when all of the upper-most tip 124 is sanded away. Preferably, the granular material is also slightly colored so as to give a visual indicator to an installer when the installer is close to sanding away the entirety of upper-most tip 124. When the installer sees and feels the granular tip sanding away, the installer could then slow the sanding process to ensure that the spackle is sanded exactly flush with the front of the sanding shield.

While the upper-most tip 124 of spackle rim 122 projects slightly from the front of sanding shield 110, in alternative embodiments the upper-most tip of spackle rim 122 could be sized and dimensioned to be flush with the front surface of sanding shield 110. In such an embodiment, the installer would simply sand away spackle until the installer sees the transparent or colored surface of sanding shield 110, and would then stop before sanding away any significant portion (more than 0.01 in or 0.254 mm) of spackle rim 122.

Figure 3:
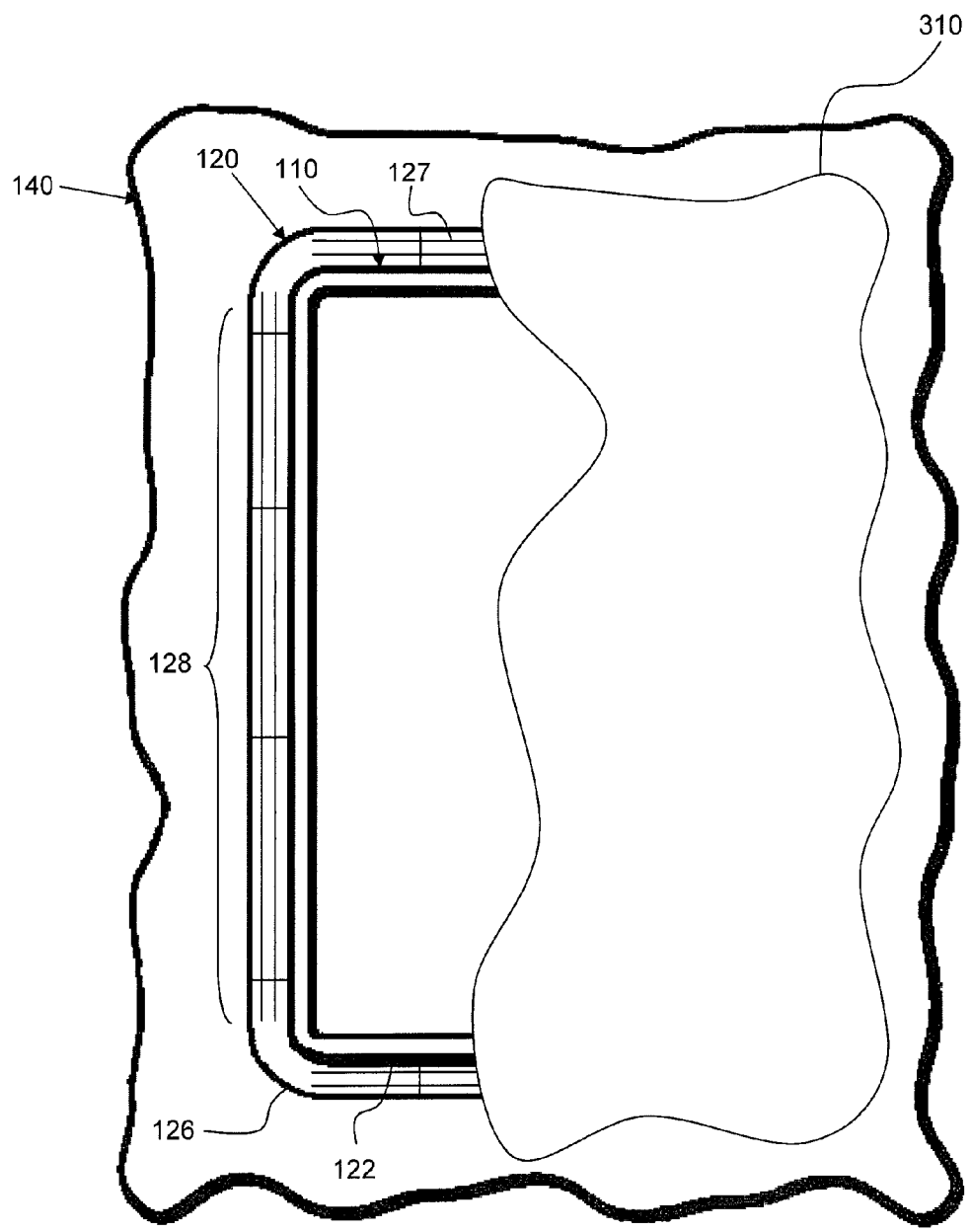
FIG. 3 is a front perspective view of the mounting bracket and sanding shield of FIG. 2 with spackle component spread across a surface of the sanding shield.
Figure 4:
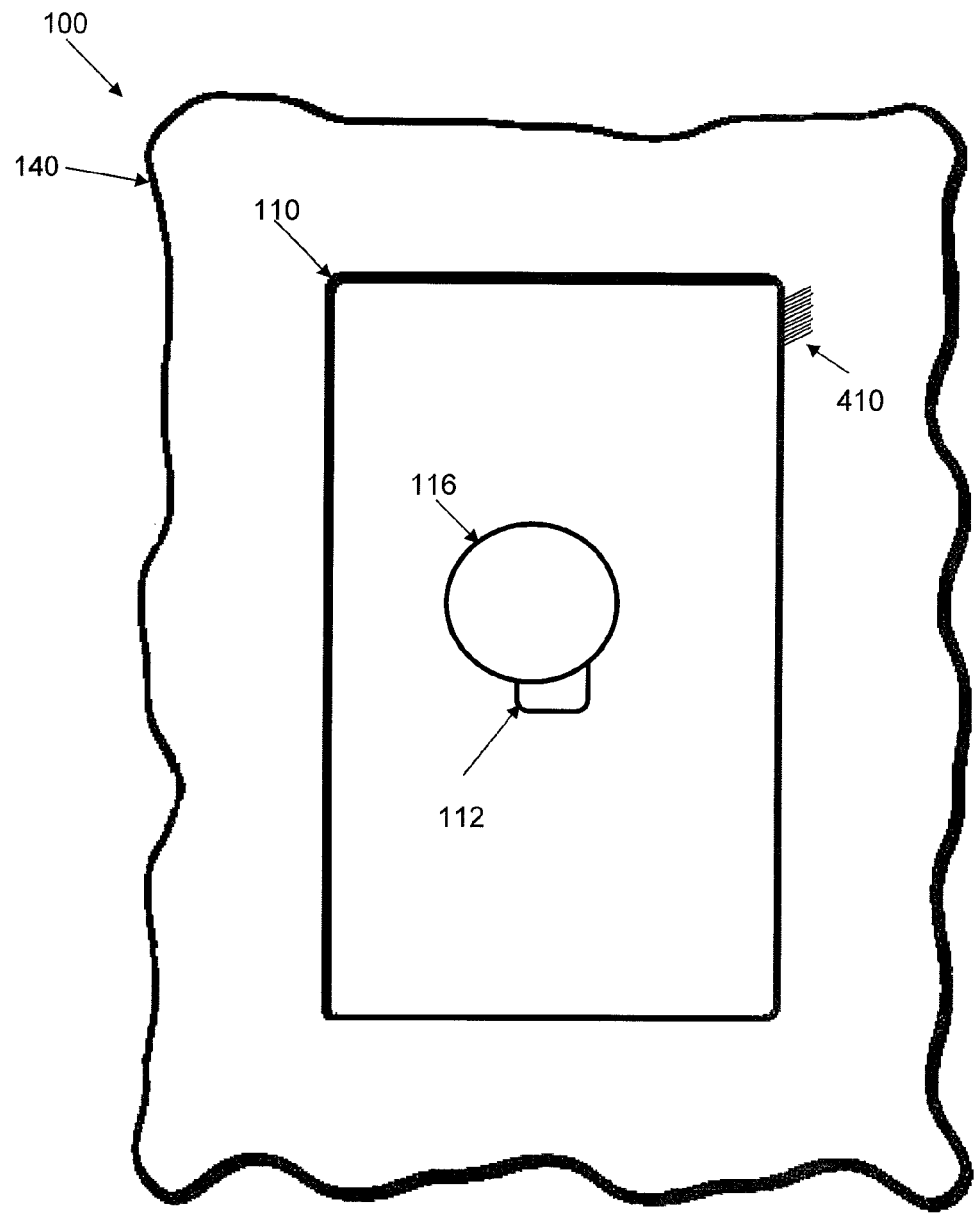
FIG. 4 is a front perspective view of the mounting bracket and sanding shield of FIG. 3 after the spackle component has been sanded away.

As shown in FIG. 3, an installer could spread spackle component 310 over gripping surface 126, completely covering portions of partition 140, mounting bracket 120, and wall component 150. Once the spackle component is dry, the installer could then sand away spackle component 310 to ensure a perfectly flush surface, as shown in FIG. 4. When the installer sands away the upper-most tip 124 of spackle rim 122, colored granular material 410 then provides a visual cue to the installer that he should slow down his sanding until all of sanding shield 110 is visible. Preferably, colored granular material is a material that can be easily cleaned or erased, such as graphite. Sanding shield 110 could then be removed using handle 116 by the installer to be replaced by a fascia plate (not shown).

Figure 5:
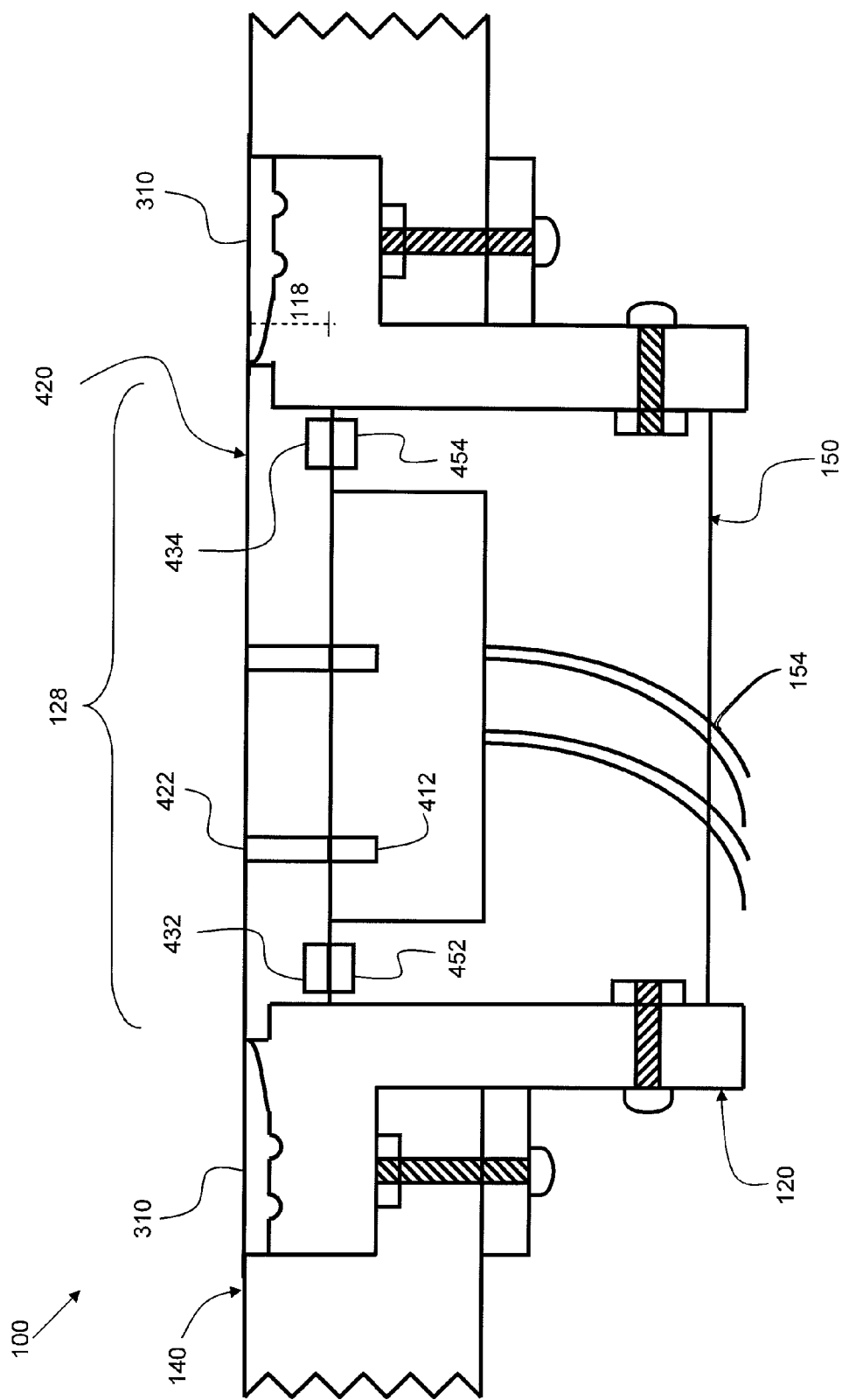
FIG. 5 is a front perspective view of the mounting bracket of FIG. 2 with an installed component and fascia plate.
Figure 6:
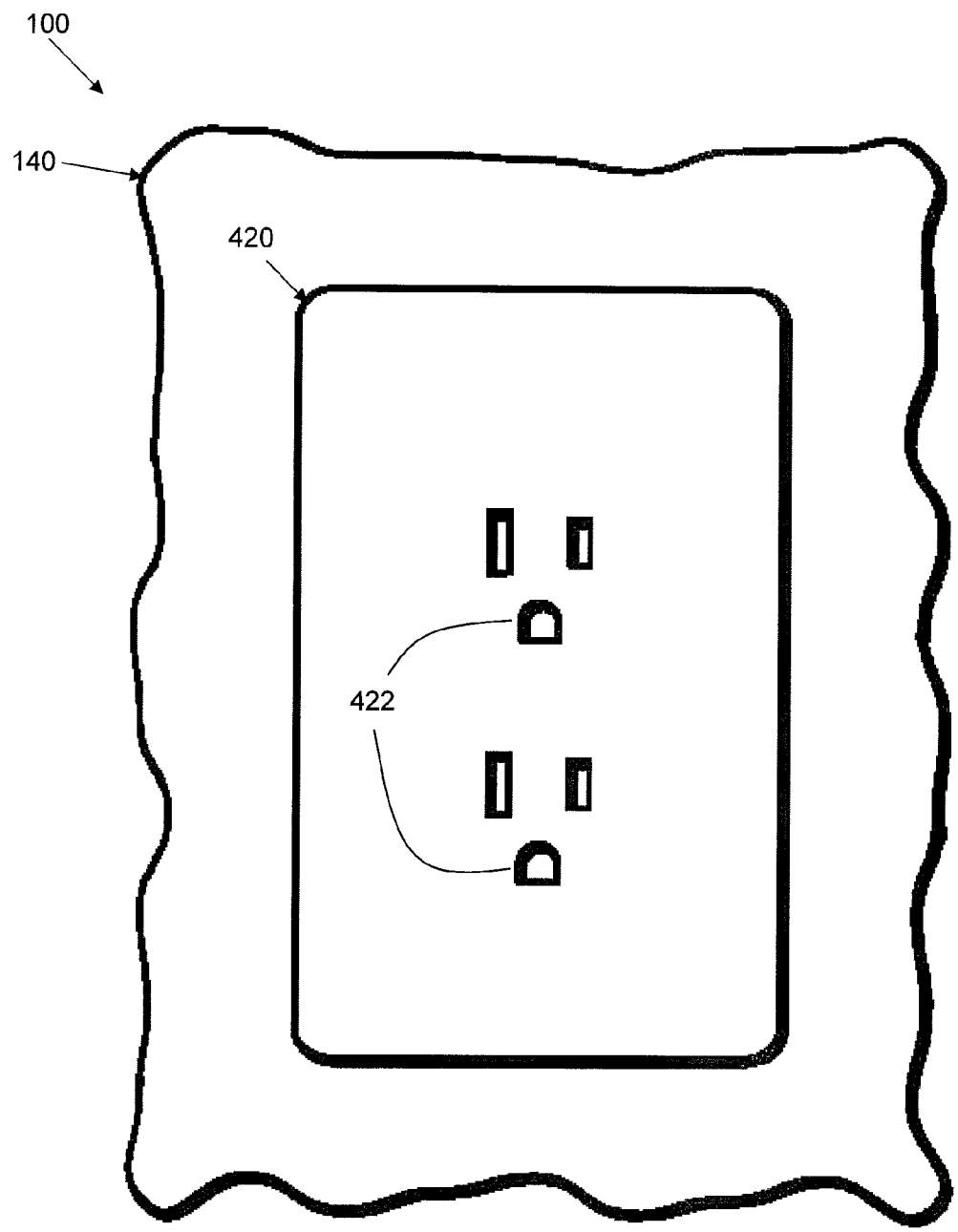
FIG. 6 is a side cross-sectional view of the mounting bracket and fascia plate of FIG. 3.

In FIGS. 5 and 6, sanding shield 110 has been replaced with fascia plate 420 that fits over component 410. Fascia plate 420 has substantially the same dimensions (length, width, and thickness) as sanding shield 110, but has holes 422 that reveal electrical plugs 412 in component 410. (note that the electrical plugs 412 and holes 422 are not drawn to scale in FIG. 5) Fascia plate 420's thickness 428 is substantially the same as sanding shield 110's thickness 118. Since fascia plate 420 has substantially the same thickness as sanding shield 110, fascia plate 420 is also substantially flush with the front of bracket 120 and partition 140.

While fascia plate 420's dimensions also allow it to be mountable within recessed opening 128 via friction forces without needing additional attachment mechanisms, fascia plate 420 has magnetically attractable material 432 and 434 to help keep it in place. Magnetically attractable material 432 and 434 are attracted to magnetically attractable material 442, 444, 446, and 448 in component 410 to hold fascia plate 420 against component 410, respectively. As defined herein, "magnetically attractable material" is a material with a relative magnetic permeability greater or equal to one. Preferably, magnetically attractable materials 442, 444, 446, and 448 are magnets, while magnetically attractable materials 432, 434, 436, and 438 are merely ferrous, but the opposite could be true without departing from the scope of the invention.

FIG. 7 shows alternative fascia plates 730 and 740 that have similar sizes and dimensions to fascia plate 420, such that that each of the fascia plates are substantially flush with the surrounding front surface of the bracket and the wallboard when mounted to recessed opening 128. Alternative fascia plates if a installer wants to use the same bracket and spackle rim for different components, or if a user wants a different color or design for the same component.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A kit for limiting a sandable area about an in-wall component, the kit comprising:
 a bracket attachable to the component;
 a spackle rim with a recessed opening that provides access to the bracket;

a sanding shield mountable within the recessed opening, wherein the sanding shield covers at least a portion of the opening and has a perimeter that aligns with an inner edge of the opening; and a fascia plate interchangeably mountable with the sanding shield, wherein the fascia plate has a perimeter that aligns with an inner edge of the opening and has an opening that reveals a portion of the component that the sanding shield does not reveal.

2. The kit of claim 1, wherein the sanding shield covers an entire perimeter of the recessed opening.

3. The kit of claim 2, wherein the fascia plate reveals a portion of the component.

4. The kit of claim 1, wherein the sanding shield comprises a transparent material.

5. The kit of claim 1, wherein the sanding shield comprises a material having color other than white.

6. The kit of claim 1, wherein the sanding shield comprises a handle.

7. The kit of claim 1, wherein the sanding shield has substantially the same thickness as the fasica plate.

8. The kit of claim 1, wherein the fascia plate comprises a magnetically attractable material.

9. The kit of claim 1, wherein the rim comprises a white material.

10. The kit of claim 1, wherein a tip of the rim comprises a granular material.

11. The kit of claim 1, wherein the rim protrudes from a front of the sanding shield by at least 0.01 in. (0.254 mm).

* * * * *